US010476421B1

(12) United States Patent
Khalil et al.

(10) Patent No.: US 10,476,421 B1
(45) Date of Patent: Nov. 12, 2019

(54) OPTIMIZED SWITCHED RELUCTANCE PHASE CURRENT CONTROL IN A CONTINUOUS CONDUCTION MODE

(71) Applicant: Caterpillar Inc., Deerfield, IL (US)

(72) Inventors: Ahmed Khalil, Dunlap, IL (US); Carlos Nino Baron, Edwards, IL (US); Chad Brewer, West Peoria, IL (US); Jackson Wai, Dunlap, IL (US); Yash Bhatia, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/115,148

(22) Filed: Aug. 28, 2018

(51) Int. Cl.
*H02P 23/00* (2016.01)
*H02P 25/08* (2016.01)
*H02P 6/17* (2016.01)
*H02P 25/092* (2016.01)
*H02P 6/08* (2016.01)

(52) U.S. Cl.
CPC ............ *H02P 23/0027* (2013.01); *H02P 6/17* (2016.02); *H02P 25/0805* (2016.02); *H02P 6/08* (2013.01); *H02P 25/092* (2016.02)

(58) Field of Classification Search
USPC .............................................. 318/254.1, 701
See application file for complete search history.

(56) References Cited

U.S. PATENT DOCUMENTS

| 6,291,949 B1 * | 9/2001 | Green ................... H02P 1/163 318/254.1 |
| 6,342,772 B1 * | 1/2002 | Gallegos-Lopez ..... H02P 25/08 318/701 |
| 6,703,808 B1 * | 3/2004 | Blackburn ............... H02P 9/00 318/701 |
| 2014/0184112 A1 | 7/2014 | Kim et al. |
| 2014/0184131 A1 | 7/2014 | Baek et al. |
| 2015/0162863 A1 * | 6/2015 | Emadi .................. H02P 25/098 318/254.1 |
| 2015/0280626 A1 * | 10/2015 | Ye ........................ H02P 25/089 318/400.32 |
| 2017/0187315 A1 * | 6/2017 | Deguchi ............... H02P 25/098 |
| 2017/0261559 A1 * | 9/2017 | Chen ..................... G01R 31/34 |

FOREIGN PATENT DOCUMENTS

| CN | 104201949 B | 8/2016 |
| CN | 107404261 A | 11/2017 |
| KR | 101660509 B1 | 9/2016 |

* cited by examiner

*Primary Examiner* — Bentsu Ro
(74) *Attorney, Agent, or Firm* — Harrity & Harrity LLP (57) ABSTRACT

A device may select an operation mode based on at least one of a motor speed, a motor transient speed, or a motor power command value. The operation mode may be selected from a group of operation modes including a single pulse mode, a continuous conduction mode, and a variable dwell continuous conduction mode. The device may control a switched reluctance motor using the operation mode.

20 Claims, 5 Drawing Sheets

OPTIMIZED SWITCHED RELUCTANCE PHASE CURRENT CONTROL IN A CONTINUOUS CONDUCTION MODE

TECHNICAL FIELD

The present disclosure relates generally to control for a switched reluctance motor and, more particularly, to a switched reluctance motor control system to provide optimized switched reluctance phase current control in a continuous conduction mode for a switched reluctance motor.

BACKGROUND

A machine may include a transmission coupled to a power source, such as an internal combustion engine or an electric motor, to enable the machine to be repositioned and/or to travel between locations. With increased interest in energy conservation and avoidance of use of fossil fuels, use of electric motors is becoming more common. Electric motors may be used to convert electrical energy into mechanical power to drive the machine. For example, electric motors may be used in a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other equipment.

Alternatively, some machines may include both an electric motor and an internal combustion engine. For example, an electrical drive train of a machine, such as a tractor, may include an internal combustion engine, a generator coupled to the internal combustion engine, a direct current (DC) power source, and a motor. In this case, the internal combustion engine may be used to reposition the machine, and the generator, the DC power source, and the motor may be used to drive one or more implements of the machine.

The motor may be a switched reluctance (SR) motor. An amount of current provided to the switched reluctance motor may be controlled based on an operating mode of the switched reluctance motor. For example, a controller may implement a current regulation operating mode, such as for lower speed (e.g., less than a threshold speed) tasks that require greater amounts of motor torque (e.g., greater than a threshold motor torque value). In the current regulation operating mode, the controller may limit current in connection with an amount of back electromotive force from the switched reluctance motor, thereby resulting in a constant motor torque being achieved at increasing motor speeds.

In contrast, the controller may implement a single pulse operating mode for higher speed tasks requiring greater amounts of power output relative to the current regulation mode. In the single pulse operating mode, the controller may sequentially advance a phase of current provided to the switched reluctance motor to maintain a constant power at increasing motor speeds and decreasing levels of motor torque.

Further, the controller may implement a continuous conduction operating mode, which may be defined by a fixed dwell. The fixed dwell, sometimes termed a static dwell, may represent a conduction window during which voltage is applied to each phase of the switched reluctance motor, and may correspond to a difference between a theta on angle at which voltage is applied and a theta off angle at which voltage is not applied. The theta on angle and theta off angle may represent positions of the switched reluctance rotor, of the motor, relative to a stator, of the switched reluctance motor. The dwell may be fixed at an angle greater than 180 degrees (e.g., 181 degrees, 182 degrees, 185 degrees, etc.), thereby providing a transient over-torque for a fixed DC voltage. In this way, the controller may enable increased motor power to achieve increased motor speed relative to the single pulse mode at decreased levels of motor torque. However, a transition between a single pulse operation mode and a continuous conduction operation mode with a fixed dwell may result in a hard transition in a motor torque at some load conditions.

One attempt to improve motor controllers is disclosed in United States Patent Application Publication No. 2014/0184131 that was filed by Samsung Electro-Mechanics Co., LTD. on Dec. 26, 2013 ("the '131 patent publication"). In particular, the '131 patent publication discloses a method of controlling a switched reluctance motor. The method, disclosed in the '131 patent publication, includes sensing a variation of a load of a switched reluctance motor and controlling both a dwell angle and a pulse width modulation duty ratio of the switched reluctance motor.

However, controlling both a dwell angle and a pulse width modulation duty ratio of a switched reluctance motor may not enable optimized control of a switched reluctance motor at differing motor speeds, motor torques, powers, and/or the like. A switched reluctance motor control system for operation mode selection of the present disclosure solves one or more problems set forth above and/or other problems in the art.

SUMMARY

According to some implementations, the present disclosure is related to a method. The method may include selecting, by a controller, an operation mode based on at least one of a motor speed, a motor transient speed, or a motor power command value. The operation mode may be selected from a group of operation modes including a single pulse mode, a continuous conduction mode, and a variable dwell continuous conduction mode. The method may include controlling, by the processor, a switched reluctance motor using the operation mode.

According to some implementations, the present disclosure is related to a switched reluctance motor control system. The switched reluctance motor control system may include a memory and a processor. The processor may be configured to determine to transition from a single pulse operation mode to a continuous conduction operation mode. The processor may be configured to select, based on determining to transition to the continuous conduction operation mode, a variable dwell continuous conduction operation mode or a fixed conduction angle continuous conduction operation mode. The processor may be configured to control a switched reluctance motor using the variable dwell continuous conduction operation mode or the fixed conduction angle continuous conduction operation mode.

According to some implementations, the present disclosure is related to a machine. The machine may include a motor, an inverter coupled to the motor, and a processor. The processor may be configured to select an operation mode, of a plurality of operation modes, for controlling a current provided by the inverter to the motor based on at least one of motor speed, a motor transient speed, or a motor power command value. A first operation mode, of the plurality of operation modes, may be associated with a first fixed current value and a first fixed conduction angle and a motor speed less than or equal to a threshold. A second operation mode, of the plurality of operation modes, may be associated with a second fixed current value and a variable conduction angle and the motor speed greater than the threshold. A third operation mode, of the plurality of operation modes, may be associated with a variable current value and a second fixed conduction angle and the motor speed greater than the threshold. The processor may be configured to control the motor using the selected operation mode.

DETAILED DESCRIPTION

This disclosure relates to a switched reluctance motor control system to perform operation mode selection for a switched reluctance motor. The switched reluctance motor control system has universal applicability to any machine utilizing such a switched reluctance motor control system. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, and/or the like. Moreover, one or more implements may be connected to the machine and controlled using an electric motor associated with the switched reluctance motor control system described herein.

Figure 1:
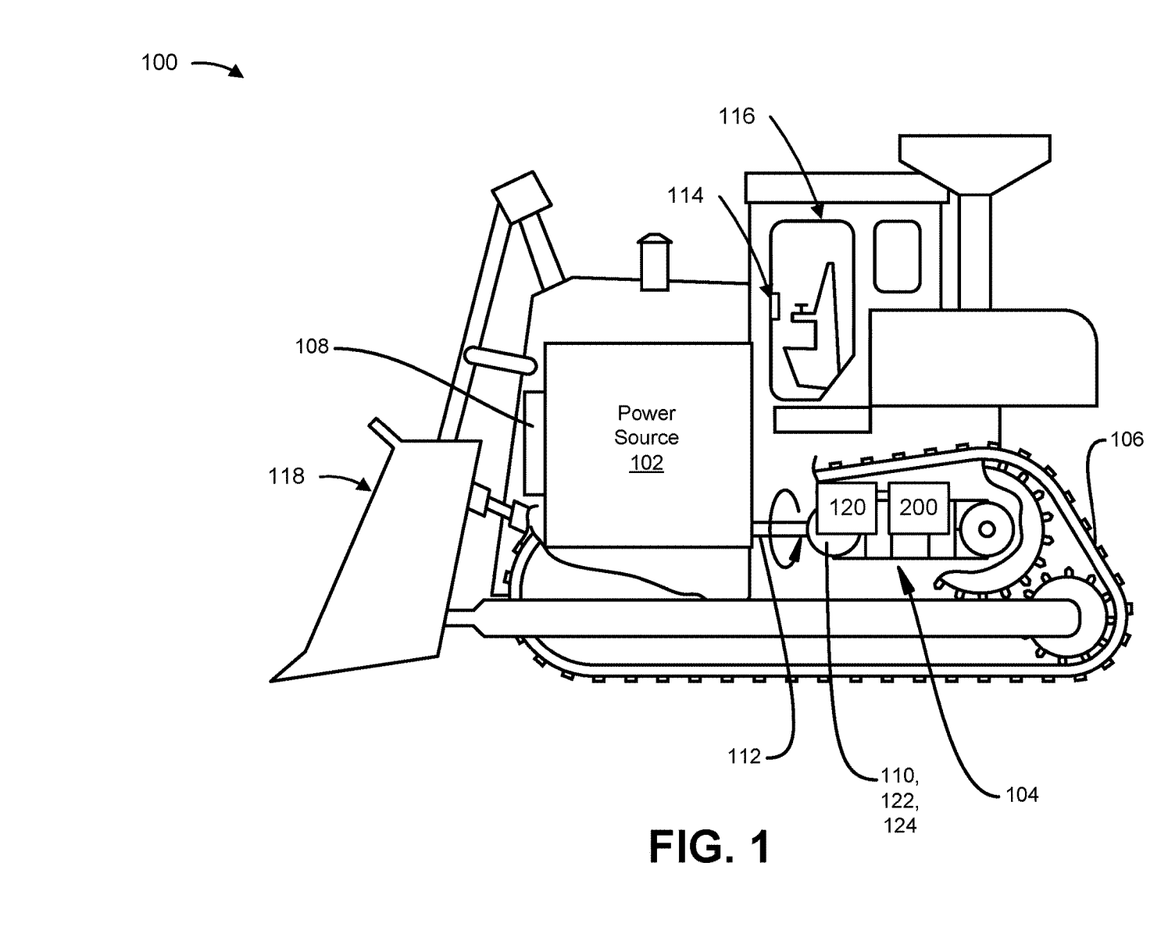
FIG. 1 is a diagram of an example machine that includes a switched reluctance motor control system.

FIG. 1 is a diagram of an example machine 100 that includes a switched reluctance motor control system. The machine 100 is shown as a track type tractor but may include any type of machine that includes switched reluctance motor control system capable of controlling an electric motor (e.g., a switched reluctance motor) of machine 100.

As shown, machine 100 may have a power source 102, an electric drive system 104, a traction system 106, an inverter 108, a motor 110, and a drive shaft 112. The power source 102 is configured to supply power to the machine 100. In some implementations, the power source 102 may be a direct current (DC) power source. The power source 102 may be operably arranged to receive control signals from operator controls 114 in operator station 116. Additionally, the power source 102 may be operably arranged with the electric drive system 104 and/or an implement 118 to selectively operate the electric drive system 104 and/or the implement 118 according to control signals received from the operator controls 114. The power source 102 may provide operating power for the propulsion of the electric drive system 104 and/or the operation of the implement 118 via, for example, the electric drive system 104, the inverter 108, the motor 110, the drive shaft 112, and/or the like.

The electric drive system 104 may be operably arranged with the power source 102 to selectively propel the machine 100 via control signals from the operator controls 114. The electric drive system 104 may be operably connected to a plurality of ground-engaging members, such as traction system 106, as shown, which may be movably connected to the machine 100 through axles, drive shafts, a transmission, and/or other components and which may be movably connected to the electric drive system 104 via the motor 110 and the drive shaft 112. In some implementations, the traction system 106 may be provided in the form of a track-drive system, a wheel-drive system, or any other type of drive system configured to propel the machine 100. In some implementations, the electric drive system 104 may be operably arranged with power source 102 to selectively operate the implement 118, which may be movably connected to the machine 100 and to the electric drive system 104.

The inverter 108 may be electrically connected to the power source 102 and/or the electric drive system 104. In some implementations, the inverter 108 may receive a DC current from the power source 102 and may control a phase of the DC current to provide an AC current to the motor 110, which may be a switched reluctance (SR) motor. Additionally, or alternatively, inverter 108 may provide the AC current to a generator. In this way, the inverter 108 may provide operating power for the propulsion of the machine 100 and/or the operation of the implement 118. The inverter 108 and/or the motor 110 may receive control signals from the switched reluctance motor control system to control an operation mode of the motor 110; to control a current, a voltage, a motor torque, and/or the like provided to the motor 110; to control a phase of current provided to the motor 110; and/or the like.

The motor 110 may be electrically coupled to a sensor 120, which may provide feedback to the switched reluctance motor control system 200 to enable control of the inverter 108, the motor 110, and/or the like. For example, the sensor 120 may be a current sensor, a motor speed sensor, a motor torque sensor, and/or the like that provides feedback information to the switched reluctance motor control system 200 to enable the switched reluctance motor control system 200 to select an operating mode for the motor 110 and to control the inverter 108 and the motor 110 in connection with the operation mode. The motor 110 may include a rotor 122 and a stator 124. The rotor 122 and/or the stator 124 may be electrically coupled to the sensor 120, which may provide feedback information identifying a position of the rotor 122 relative to the stator 124 to enable control of the motor 110.

The implement 118 may be operably arranged with the electric drive system 104 such that the implement 118 is selectively movable through control signals transmitted from the operator controls 114 to the electric drive system 104, the inverter 108, the motor 110, the drive shaft 112, and/or the like. The illustrated implement 118 is a tractor loader. Other embodiments can include any other suitable implement for a variety of tasks, such as, for example, dozing, blading, brushing, compacting, grading, lifting, ripping, plowing, and/or the like. Example implements include dozers, augers, buckets, breakers/hammers, brushes, compactors, cutters, forked lifting devices, grader bits and end bits, grapples, and/or the like.

As indicated above, FIG. 1 is provided as an example. Other examples are possible and may differ from what was described in connection with FIG. 1.

Figure 2:
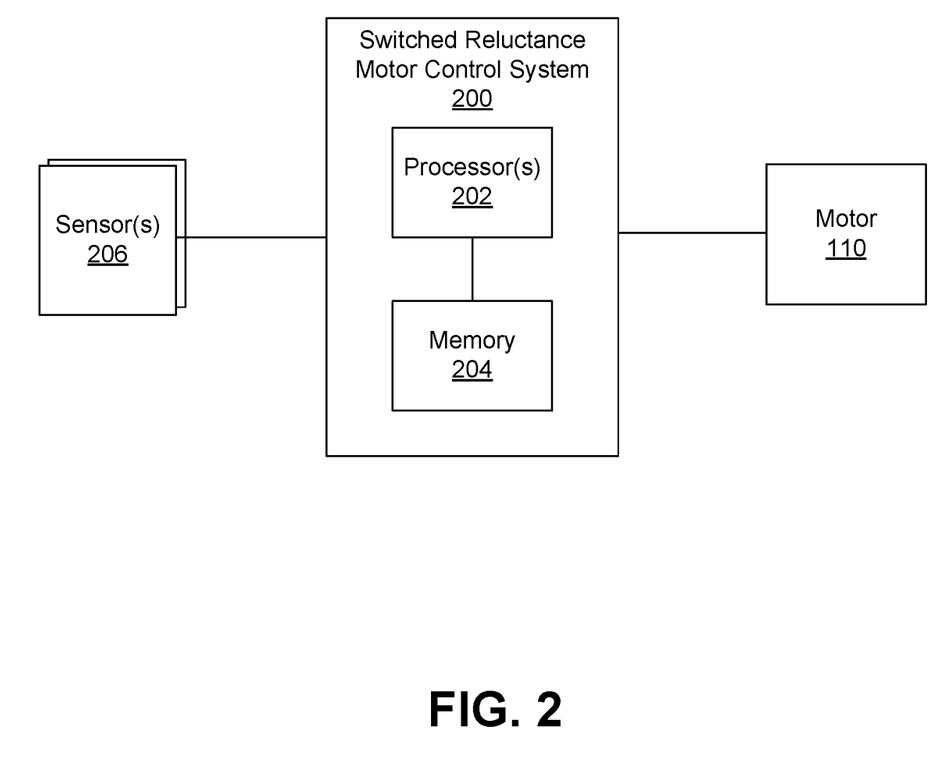
FIG. 2 is a diagram of an example switched reluctance motor control system that may be used with the machine of FIG. 1.

FIG. 2 is a diagram of an example switched reluctance motor control system 200 and associated components that may interact with the switched reluctance motor control system 200.

The switched reluctance motor control system 200 includes one or more processors 202. Processor 202 is implemented in hardware, firmware, or a combination of hardware and software. Processor 202 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 202 includes one or more processors capable of being programmed to perform a function. Memory 204 includes a random access memory (RAM), a read only memory (ROM), and/or another type of dynamic or static storage device (e.g., a flash memory, a magnetic memory, and/or an optical memory) that stores information and/or instructions for use by processor 202.

In some implementations, the switched reluctance motor control system 200 may be an electronic control unit (ECU), an electronic control module (ECM), a controller, and/or the like of the machine 100 and/or the motor 110. The processor 202 may execute one or more instructions and/or commands to control one or more components of machine 100, such as to control operation of the inverter 108, the motor 110, and/or the like. The memory 204 may store program code for execution by the processor 202 and/or for storing data in connection with execution of such program code by the processor 202.

The switched reluctance motor control system 200 may receive one or more input signals from various components of the machine 100, may operate on the one or more input signals to generate one or more outputs signals (e.g., by executing a program using the input signals as input to the program), and may output the one or more output signals to various components of the machine 100. For example, the switched reluctance motor control system 200 may be electronically connected (e.g., via wired or wireless connection) to one or more sensors 206 (e.g., which may correspond to the sensor 120), to the motor 110, and/or the like, and may receive input from the sensors 206 and/or the motor 110. In some implementations, the switched reluctance motor control system 200 may determine to transition from a single pulse operation mode to a continuous conduction operation mode. In this case, the switched reluctance motor control system 200 may select a variable dwell continuous conduction operation mode or a fixed dwell continuous conduction operation mode, and control a switched reluctance motor using the variable dwell continuous conduction operation mode or the fixed dwell continuous conduction operation mode.

Sensors 206 include a set of sensor devices that provide information regarding a status of the machine 100. For example, sensors 206 may include a current sensor, a flux sensor, a motor speed sensor (e.g., a sensor to determine a speed of the rotor 122), a motor torque sensor, a motor transient speed sensor, a motor power sensor, a position sensor (e.g., a sensor to determine a position of rotor 122 relative to stator 124), and/or the like. For example, a first sensor 206 may provide information identifying a motor speed and a second sensor 206 may provide information identifying a motor transient speed, and the switched reluctance motor control system 200 may determine an operation mode for motor 110. In this case, based on the operation mode, switched reluctance motor control system 200 may control motor 110 based on the motor speed and the motor transient speed.

The number and arrangement of components shown in FIG. 2 are provided as an example. In practice, there may be additional components, fewer components, components, or differently arranged components than those shown in FIG. 2. Furthermore, two or more components shown in FIG. 2 may be implemented within a single component, or a single component shown in FIG. 2 may be implemented as multiple, separate, and/or distributed components. Additionally, or alternatively, a set of components (e.g., one or more components) may perform one or more functions described as being performed by another set of components.

Figure 3:
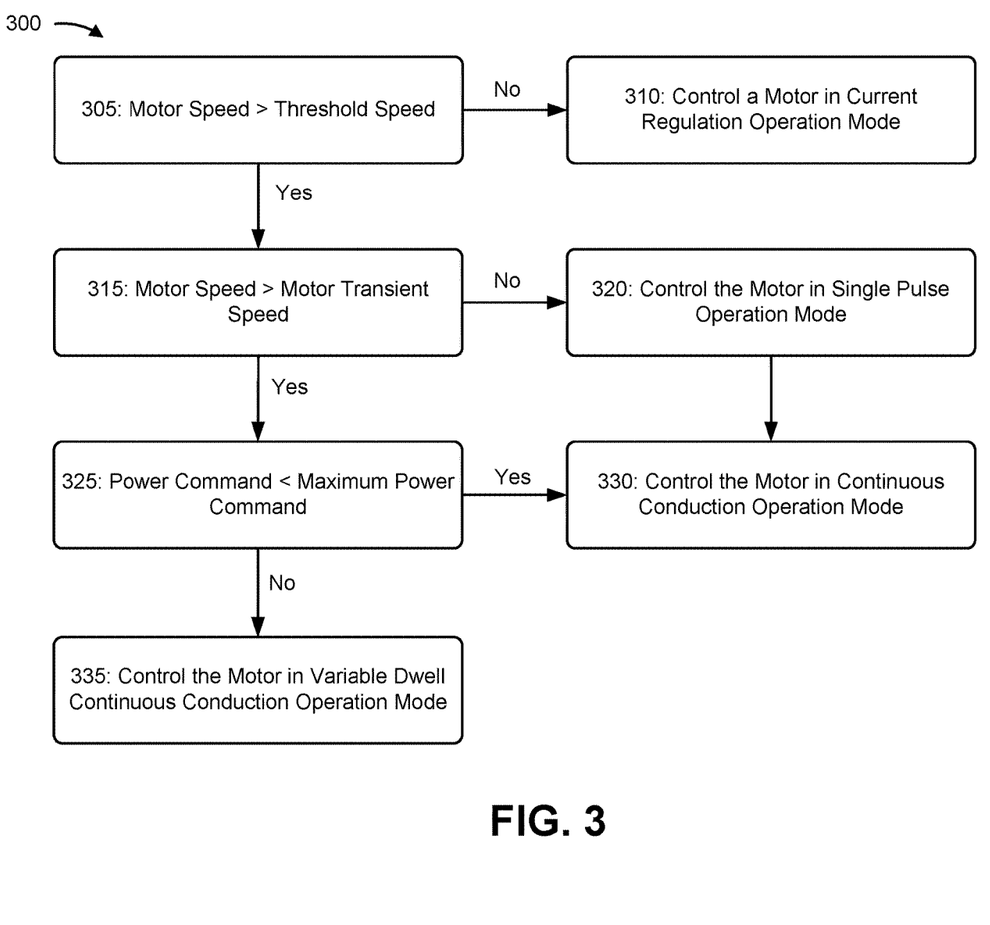
FIG. 3 is a flow chart of an example process for determining an operation mode for a switched reluctance motor.
Figure 4:
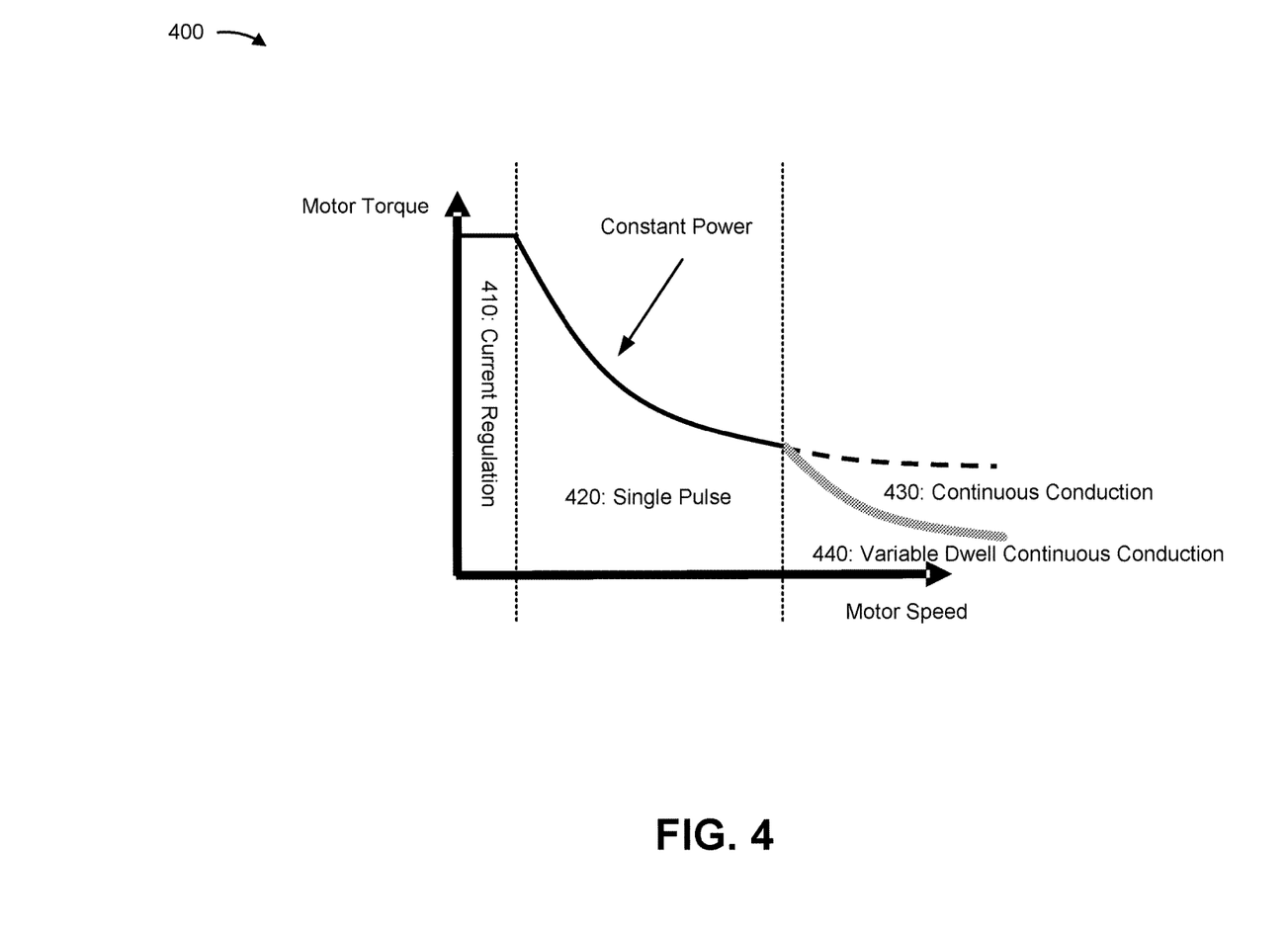
FIG. 4 is a diagram of conditions of a motor relating to the example process shown in FIG. 3.

FIG. 3 is a flow chart of an example process 300 for control of a switched reluctance motor. In some implementations, process 300 may be performed by the switched reluctance motor control system 200. FIG. 4 is a diagram of an example 400 of control of a switched reluctance motor.

As shown in FIG. 3, process 300 may include determining whether a motor speed is greater than a threshold speed (block 305). For example, the switched reluctance motor control system 200 may determine whether the motor speed is greater than the threshold speed. In some implementations, the switched reluctance motor control system 200 may determine the motor speed based on feedback from a sensor 206 coupled to the motor 110. For example, the switched reluctance motor control system 200 may receive feedback identifying the motor speed, and may determine whether the motor speed is greater than a threshold speed associated with using the current regulation operation mode. In this way, at less than or equal to the threshold speed, the switched reluctance motor control system 200 may achieve high (e.g., greater than a threshold) levels of motor torque at low (e.g., less than or equal to the threshold) motor speeds.

As shown in FIG. 3, based on the motor speed not being greater than the threshold speed (block 305—NO), process 300 may include controlling a motor in the current regulation operating mode (block 310). For example, based on the motor speed not being greater than the threshold speed, the switched reluctance motor control system 200 may control the motor 110 in the current regulation operating mode, as shown in FIG. 4, and by reference number 410. In this case, current may be limited in connection with a back electromotive force (EMF) associated with the motor 110. In some implementations, the switched reluctance motor control system 200 may, at a first range of speeds less than the threshold speed, control a current provided to the motor 110 to regulate a temperature associated with the motor 110. In this way, the switched reluctance motor control system 200 achieves thermal management in the first range of speeds. Additionally, or alternatively, the switched reluctance motor control system 200 may, at a second range of speeds less than the threshold speed, control the motor 110 to optimize (e.g., to minimize) motor torque ripple for the motor 110.

As shown in FIG. 3, based on the motor speed being greater than the threshold speed (block 305—YES), process 300 may include determining whether a motor speed is greater than a motor transient speed (block 315). For example, the switched reluctance motor control system 200 may determine whether the motor speed is greater than the motor transient speed. In some implementations, the switched reluctance motor control system 200 may determine the motor speed and/or the motor transient speed based on information received from a sensor, such as a sensor 206.

As shown in FIG. 3, based on the motor speed not being greater than the motor transient speed (block 315—NO), process 300 may include controlling the motor in single pulse operation mode (block 320). For example, the switched reluctance motor control system 200 may control the motor 110 in the single pulse operation mode, as shown in FIG. 4, and by reference number 420. In this case, the switched reluctance motor control system 200 may maintain constant power at increased motor speeds and with reduced motor torques relative to controlling in the current regulation operation mode. In some implementations, the switched reluctance motor control system 200 may set a current command when controlling the motor 110 in the single pulse operation mode. For example, the switched reluctance motor control system 200 may set a current to a peak current value for the motor 110. Additionally, or alternatively, the switched reluctance motor control system 200 may set a theta off value and a theta on value for a conduction window of the motor 110 to maximum effective values for the motor 110, which may be determined based on stored information regarding a configuration of the motor 110.

As shown in FIG. 3, based on the motor speed being greater than the motor transient speed (block 315—YES), process 300 may include determining whether a power command is less than a maximum power command (block 325). For example, the switched reluctance motor control system 200 may determine whether the power command is less than the maximum power command for the motor 110. In some implementations, the switched reluctance motor control system 200 may determine the maximum power command based on stored information identifying the maximum power command for the motor 110.

As shown in FIG. 3, based on the power command being less than the maximum power command (block 325—YES), process 300 may include controlling the motor in continuous conduction operation mode (block 330). For example, the switched reluctance motor control system 200 may control the motor 110 in the continuous conduction operation mode with a fixed dwell, as shown in FIG. 4, and by reference number 430. In some implementations, the switched reluctance motor control system 200 may set the dwell to a fixed value in the continuous conduction operation mode. For example, based on a configuration of the motor 110, the switched reluctance motor control system 200 may set a theta off value and a theta on value such that a dwell is a value greater than 180 degrees, such as 181 degrees, 182 degrees, 185 degrees, and/or the like. Although implementations, described herein are described in terms of example dwell values, other dwell values are possible.

In some implementations, the switched reluctance motor control system 200 may perform current chopping in the continuous conduction operation mode. In some implementations, the switched reluctance motor control system 200 may determine a current command for controlling a motor torque of the motor 110. For example, based on a lookup table, a stored configuration, an interpolation value determined based on an interpolation procedure, and/or the like, the switched reluctance motor control system 200 may determine a variable power command, and may use the variable power command and the fixed dwell to maintain constant power for the motor 110.

As shown in FIG. 3, based on the power command not being less than the maximum power command (block 325—NO), process 300 may include controlling the motor in the variable dwell continuous conduction operation mode (block 335). For example, the switched reluctance motor control system 200 may control the motor 110 in the variable dwell continuous conduction operation mode, as shown in FIG. 4, and by reference number 440. In some implementations, the switched reluctance motor control system 200 may use a fixed current command for the motor 110. For example, the switched reluctance motor control system 200 may select a current command associated with achieving a peak current in the single pulse operation mode.

In some implementations, the switched reluctance motor control system 200 may determine a dwell for the variable dwell continuous conduction operation mode. For example, the switched reluctance motor control system 200 may set a theta off value to a maximum effective value for theta off for the motor 110, and may determine the theta on value based on a motor torque of the motor 110. In this case, the switched reluctance motor control system 200 may determine the theta on value based on a lookup table, a stored set of values, an interpolation value determined based on an interpolation procedure, and/or the like. In this way, the switched reluctance motor control system 200 achieves a load-dependent soft transition for a torque command when switching from, for example, the single pulse operation mode to a continuous conduction operation mode, thereby reducing a likelihood of damaging a motor relative to a hard transition associated with transitioning from the single pulse operation mode to the fixed dwell continuous conduction operation mode at all motor torque load conditions.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel. As indicated above, FIG. 4 is provided as an example. Other examples are possible and may differ from what was described in connection with FIG. 4.

Figure 5:
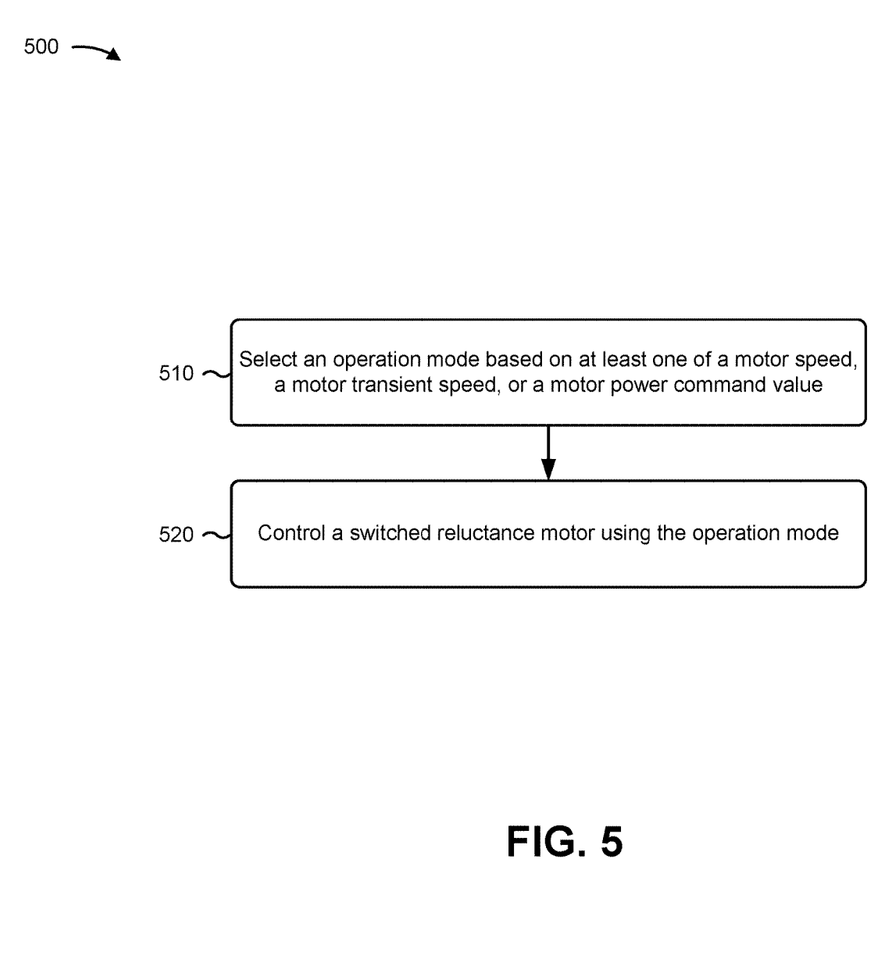
FIG. 5 is a flow chart of an example process for determining an operation mode for a switched reluctance motor.

FIG. 5 is a flow chart of an example process 500 for control of a switched reluctance motor. In some implementations, process 500 may be performed by the switched reluctance motor control system 200.

As shown in FIG. 5, process 500 may include selecting an operation mode based on at least one of a motor speed, a motor transient speed, or a motor power command value (block 510). For example, the switched reluctance motor control system 200 (e.g., using processor 202 and/or one or more rules stored in memory 204) may select an operation mode based on at least one of a motor speed, a motor transient speed, or a motor power command value. In some implementations, the operation mode is selected from a group of operation modes including a single pulse mode, a continuous conduction mode, and a variable dwell continuous conduction mode.

As further shown in FIG. 5, process 500 may include controlling a switched reluctance motor using the operation mode (block 520). For example, the switched reluctance motor control system 200 (e.g., using processor 202 and/or one or more rules stores in memory 204) may control, by the controller, a switched reluctance motor using the operation mode.

Process 500 may include additional implementations, such as any single implementation or any combination of implementations described below and/or in connection with one or more other processes described elsewhere herein.

In some implementations, process 500 includes providing a set of motor power commands to control a motor torque of the switched reluctance motor. In some implementations, process 500 includes determining that the motor transient speed is greater than the motor speed, and selecting the single pulse mode based on determining that the motor transient speed is greater than the motor speed. In some implementations, process 500 includes determining that the motor speed is greater than or equal to the motor transient speed, determining that the motor power command value satisfies a threshold, and selecting the continuous conduction mode with a static conduction angle value based on determining that the motor speed is greater than or equal to the motor transient speed and determining that the motor power command value satisfies the threshold.

In some implementations, process 500 includes determining that the motor speed is greater than or equal to the motor transient speed, determining that the motor power command value does not satisfy a threshold, and selecting the variable dwell continuous conduction mode based on determining that the motor speed is greater than or equal to the motor transient speed and determining that the motor power command value does not satisfy the threshold. In some implementations, the operation mode is the variable dwell continuous conduction mode, and the variable dwell continuous conduction mode is defined by a dynamic conduction angle value. In some implementations, the operation mode is the variable dwell continuous conduction mode, and the variable dwell continuous conduction mode is defined by a load-dependent soft transition.

In some implementations, process 500 includes interpolating from a set of motor torque values to determine a motor torque value based on the operation mode, and controlling the switched reluctance motor based on the motor torque value. In some implementations, process 500 includes performing current chopping based on the operation mode. In some implementations, process 500 includes maintaining a constant power using the operation mode.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

INDUSTRIAL APPLICABILITY

The switched reluctance motor control system 200 may be used with any machine 100 that uses a motor 110. During operation of the machine 100, the switched reluctance motor control system 200 determines one or more parameters relating to the motor 110, such as a motor speed, a motor torque, a motor transient speed, a power command being provided to the motor 110, and/or the like, and uses the one or more parameters to select an operating mode for controlling the motor 110. In this way, the switched reluctance motor control system 200 enables load-dependent soft transitioning, such as from the single pulse operation mode to the variable dwell continuous conduction operation mode that may not be achievable in a transition from the single pulse operation mode to the fixed dwell continuous conduction mode under various loading conditions. In this way, the switched reluctance motor control system 200 improves control of the motor 110, reduces a likelihood of damage to the motor 110, and/or the like.

Thus, implementing a variable dwell continuous conduction operation mode and a fixed dwell continuous conduction operation mode for control of the motor 110 may improve operation of the machine 100 and/or the motor 110.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations are possible in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of possible implementations. Although each dependent claim listed below may directly depend on only one claim, the disclosure of possible implementations includes each dependent claim in combination with every other claim in the claim set.

What is claimed is:

1. A method, comprising:
    selecting, by a processor, an operation mode based on at least one of a motor speed, a motor transient speed, or a motor power command value,
        wherein the operation mode is selected from a group of operation modes including a single pulse mode, a continuous conduction mode, and a variable dwell continuous conduction mode; and
    controlling, by the processor, a switched reluctance motor using the operation mode.

2. The method of claim 1, wherein controlling the switched reluctance motor comprises:
    providing a set of motor power commands to control a motor torque of the switched reluctance motor.

3. The method of claim 1, wherein the selecting comprises:
    determining that the motor transient speed is greater than the motor speed; and
    selecting the single pulse mode based on determining that the motor transient speed is greater than the motor speed.

4. The method of claim 1, wherein the selecting comprises:
    determining that the motor speed is greater than or equal to the motor transient speed;
    determining that the motor power command value satisfies a threshold; and
    selecting the continuous conduction mode with a static conduction angle value based on determining that the motor speed is greater than or equal to the motor transient speed and determining that the motor power command value satisfies the threshold.

5. The method of claim 1, wherein the selecting comprises:
    determining that the motor speed is greater than or equal to the motor transient speed;
    determining that the motor power command value does not satisfy a threshold; and
    selecting the variable dwell continuous conduction mode based on determining that the motor speed is greater than or equal to the motor transient speed and determining that the motor power command value does not satisfy the threshold.

6. The method of claim 1, wherein the operation mode is the variable dwell continuous conduction mode, and
    wherein the variable dwell continuous conduction mode is defined by a dynamic conduction angle value.

7. The method of claim 1, wherein the operation mode is the variable dwell continuous conduction mode, and
wherein the variable dwell continuous conduction mode is defined by a load-dependent soft transition.

8. The method of claim 1, further comprising:
interpolating from a set of motor torque values to determine a motor torque value based on the operation mode; and
wherein the controlling comprises:
controlling the switched reluctance motor based on the motor torque value.

9. The method of claim 1, wherein the controlling comprises:
performing current chopping based on the operation mode.

10. The method of claim 1, wherein the controlling comprises:
maintaining a constant power using the operation mode.

11. A switched reluctance motor control system, comprising:
a memory; and
a processor configured to:
determine to transition from a single pulse operation mode to a continuous conduction operation mode;
select, based on determining to transition to the continuous conduction operation mode, a variable dwell continuous conduction operation mode or a fixed conduction angle continuous conduction operation mode; and
control a switched reluctance motor using the variable dwell continuous conduction operation mode or the fixed conduction angle continuous conduction operation mode.

12. The switched reluctance motor control system of claim 11, wherein the fixed conduction angle continuous conduction operation mode is associated with a conduction angle greater than 180 degrees.

13. The switched reluctance motor control system of claim 11, wherein a current value for the variable dwell continuous conduction operation mode is determined based on a peak current value associated with the single pulse operation mode.

14. The switched reluctance motor control system of claim 11, wherein a conduction angle for the variable dwell continuous conduction operation mode is determined based at least in part on an interpolation value and a motor torque value.

15. The switched reluctance motor control system of claim 11, wherein a current value for the fixed conduction angle continuous conduction operation mode is determined based at least in part on an interpolation value and a motor torque value.

16. A machine, comprising:
a motor;
an inverter coupled to the motor; and
a processor configured to:
select an operation mode, of a plurality of operation modes, for controlling a current provided by the inverter to the motor based on at least one of motor speed, a motor transient speed, or a motor power command value,
wherein a first operation mode, of the plurality of operation modes, is associated with a first fixed current value and a first fixed conduction angle and a motor speed less than or equal to a threshold,
wherein a second operation mode, of the plurality of operation modes, is associated with a second fixed current value and a variable conduction angle and the motor speed greater than the threshold, and
wherein a third operation mode, of the plurality of operation modes, is associated with a variable current value and a second fixed conduction angle and the motor speed greater than the threshold; and
control the motor using the selected operation mode.

17. The machine of claim 16, wherein the first fixed current value of the first operation mode and the second fixed current value of the second operation mode are a common current value.

18. The machine of claim 16, wherein the second fixed conduction angle is 185 degrees.

19. The machine of claim 16, wherein the processor is configured to perform current chopping to control the motor.

20. The machine of claim 16, wherein the plurality of operation modes includes a fourth operation mode associated with less than a threshold current and the motor speed of less than another threshold that is smaller than the threshold.

* * * * *